May 22, 1934.  R. B. FEHR  1,959,910

HELICAL GEAR

Filed Dec. 22, 1932   4 Sheets-Sheet 1

INVENTOR
Roy B. Fehr
BY Evans & McCoy
ATTORNEYS

May 22, 1934.   R. B. FEHR   1,959,910
HELICAL GEAR
Filed Dec. 22, 1932   4 Sheets-Sheet 2

INVENTOR
Roy B. Fehr
BY
Evans & McCoy
ATTORNEYS

May 22, 1934.  R. B. FEHR  1,959,910
HELICAL GEAR
Filed Dec. 22, 1932   4 Sheets-Sheet 3
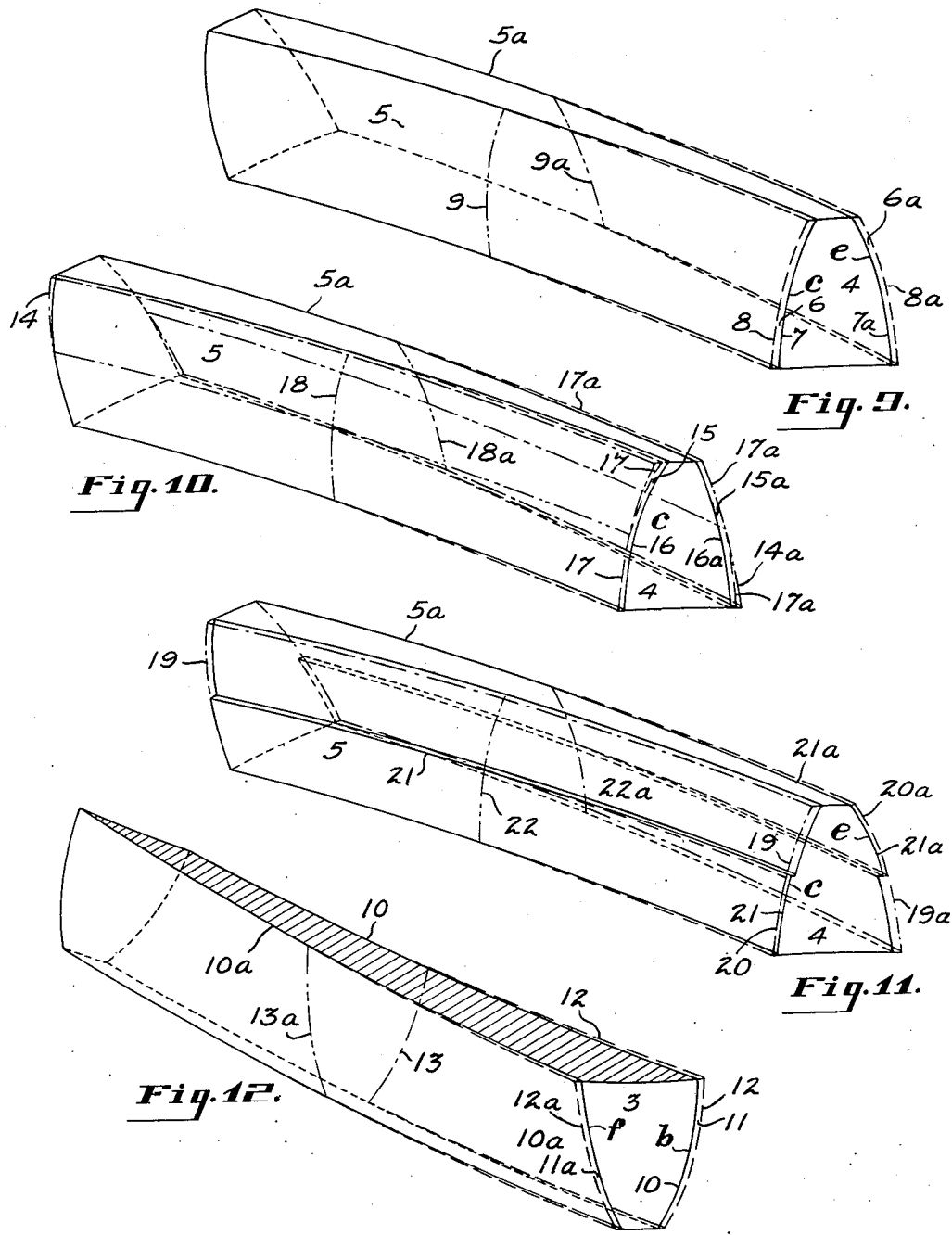

Patented May 22, 1934

1,959,910

UNITED STATES PATENT OFFICE 1,959,910

HELICAL GEAR

Roy B. Fehr, Cleveland, Ohio, assignor to Gear Processing, Inc., Cleveland, Ohio, a corporation of Ohio Application December 22, 1932, Serial No. 648,450

11 Claims. (Cl. 74—41)

This invention relates to gears and more particularly to helical gears.

One of the objects of the present invention is to provide helical gears which will remain practically silent during operation under light and heavy loads and at all operating speeds.

Another object is to provide a pair of quietly operating helical gears in which sudden impacts at the approaching ends of the working faces are substantially eliminated.

Another object is to provide a pair of quietly operating helical gears in which the bearing pressure at the approaching ends of the working faces of each pair of mating teeth is a minimum at such ends but which gradually increases to a maximum at a region intermediate the ends of the working faces after the approaching ends of such working faces are in contact with each other.

A further object is to provide a pair of quietly operating helical gears in which one or the other or both of the working faces of each pair of mating teeth are formed with relieved areas extending from the top substantially to the base thereof, each such relieved area being of maximum depth at the approaching end of the working face of the tooth in question and extending in gradually decreasing increments longitudinally of the working face, without, however, completely eliminating tooth action at such approaching end.

With the above and other objects in view, which will be apparent from the following detailed description, the present invention consists of certain features of construction and combinations of parts which will be readily apparent to those skilled in the art to which the invention appertains.

In the drawings, which illustrate suitable embodiments of the invention,

Fig. 9 is a perspective view of a tooth of the lower gear showing the application of the relieved areas of the present invention to a tooth which may be driven or which may drive a mating tooth but always in the same direction;

Fig. 10 is a view similar to Fig. 9 showing the application of the relieved areas illustrated in Fig. 9 to such a tooth in which the addendum surface of the driven side is formed with a gradual relief throughout the length thereof and in which the dedendum surface of the driving side of the tooth is formed with a gradual relief extending throughout the length thereof;

Fig. 11 is a view similar to Fig. 9 showing the relieved areas illustrated in Fig. 9 applied to a tooth in which the addendum surface of such teeth is also formed with an abrupt relief extending throughout the length thereof and in which the dedendum surface of the driving side of such teeth is formed with the abrupt relief extending throughout the length thereof;

Fig. 12 is a perspective view of one of the teeth of the upper gear showing the relieved areas illustrated in Fig. 9 applied thereto;

Figure 1:
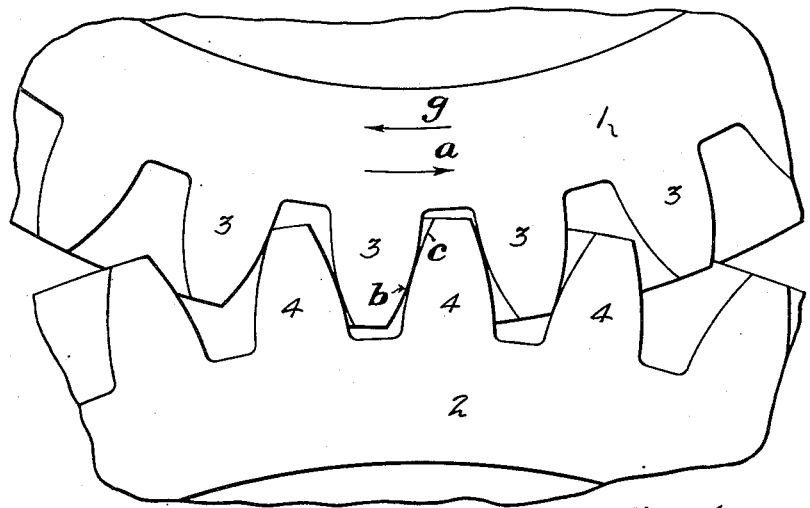
Figure 1 is a fragmentary side elevation of a pair of helical gears.

In general, the present invention is directed to a plurality of cooperating helical gears which will operate quietly at all operating speeds within the audible range and during light and heavy loads. This quietness of operation is obtained essentially by modifying the working face of one or the other or both mating teeth at the aproaching ends thereof without, however, materially sacrificing tooth action or the number of tooth contacts during the operation of the gears.

I have found in helical gearing that one of the causes of the production of gear noise during the operation of the same is the sudden impacting of the working faces of the mating gears at the approaching ends thereof and this is true regardless of the precision maintained in conforming the working faces to the most efficient and accepted conventional profiles for any given sets of conditions. Even in accurately formed conventional helical gears which have a rolling as well as a sliding action, initial engagement of the mating teeth occurs at the approaching ends of the working faces during the angle of approach and these faces come into engagement with more or less of a slap which creates the sudden impact, and, furthermore, the working face of the driving tooth at the approaching end exerts a substantial pushing or digging effect which is resisted by the working face of a driven tooth, all of which create a succession of clicking noises and vibrations which are audible in a pronounced and highly objectionable hum or whine that becomes more and more pronounced as the speed increases.

In accordance with my invention I overcome these objectionable noises to produce a practically silent operation of helical gears by modifying at least the approaching ends of the faces of the teeth which contact each other, and in doing this I provide an area of relief on the working face in question which extends from the tip substantially to the base thereof and which extends longitudinally from the approaching end of the working face of the tooth toward the receding end. This area of relief is not of uniform depth longitudinally but on the contrary is of gradually diminishing depth, it being of maximum depth at the very edge of the working face at the approaching end thereof and being faded out to a minimum of zero at a region intermediate the ends of the working face. However, if desired, this region may be at the opposite or receding end of the working face. I prefer, however, that the fading out of the area of relief shall occur at a region which will permit the full bearing pressure to be taken on the dedendum of the working face of each driven tooth within a third of the length of such working face from the approaching end thereof. Various conditions may enter into the problem which may make it desirable that the fading out occur at some other region. This, however, is contemplated by the present invention.

The area of relief may be formed on the approaching end of the working face of the driving tooth or on the approaching end of the working face of the driven tooth or in some cases it may be divided between the two mating teeth so that a portion is formed at the approaching end of the working face of each driving and driven tooth, but I form this relief to such a maximum depth that the number of tooth contacts in a given pair of helical gears is not materially sacrificed. In other words, the relief is so provided that the bearing pressure is light or at a minimum at the approaching ends of the working faces and gradually increases in intensity from the approaching ends to the region where the fading out of the relieved areas occurs, at which region the full bearing pressure is taken by the working faces.

Helical gear tooth structures can be produced, therefore, according to my invention wherein the working faces of the mating tooth of the approaching ends thereof come into initial contact with substantially no impact without material sacrifice in tooth action or the number of tooth contacts, with the result that extremely quiet operation of the teeth is possible.

As will be later pointed out with reference to the accompanying drawings which show various applications of my invention, the application is applicable to a set of helical gears in which one gear is always the driver and the other the driven, but always in the same direction of rotation, to a set of helical gears in which each gear may either drive or may be driven, but always in the same direction of rotation, and also to a set of helical gears which are reversible in the direction of rotation but in which one gear only always remains the driver.

This invention is also applicable, as will later be pointed out, to sets of helical gears in which the addendum or dedendum of the teeth of a particular gear is relieved in accordance with the invention disclosed in my Patent No. 1,813,875, granted July 7, 1931. In this connection, helical gears constructed in accordance with the invention disclosed in this patent operate quietly and I have found that by further applying the relieved areas of the present invention thereto the impact between mating teeth is further minimized.

Referring to the accompanying drawings, in which like numerals refer to like parts throughout the several views, I have shown in Fig. 1 a set of helical gears 1 and 2 having teeth 3 and 4, respectively. Considering these gears as rotating in the direction of the arrow "a", the approaching ends of the working faces of the teeth of gear 1 are designated by "b", and the approaching ends of the working faces of the teeth of gear 2 are designated by "c".

In Figs. 2 to 16, I have shown various conditions of operation of the gear teeth and also teeth having different types of the addendum or dedendum relief disclosed in my Patent 1,813,875, and in order to more clearly show the formation of the teeth in accordance with my invention I have selected for each of these views a single tooth which is broken away from the particular gear substantially at the working depth circle. By considering the teeth as broken away at this circle, I am enabled to show at the top and bottom of the tooth the extent of the gradual relief at the approaching end of the particular working face. In each of these views the tooth is greatly enlarged and the reliefs applied thereto are exaggerated to more clearly show the same.

Figure 2:
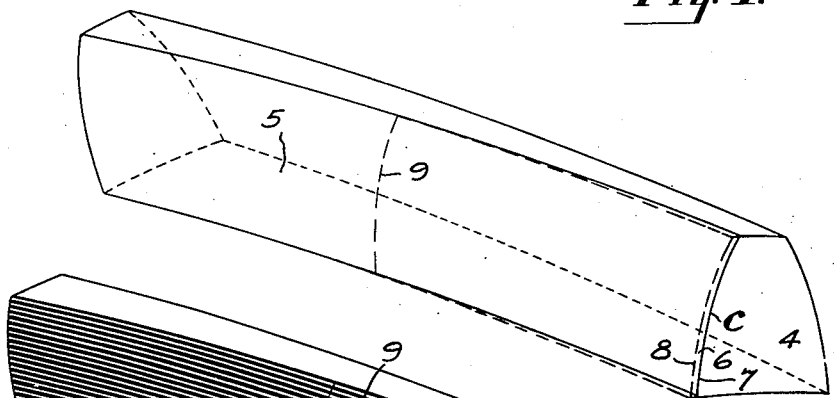
Fig. 2 is a perspective view of one of the teeth of the lower gear showing the relief of the present invention incorporated in a driven face of the tooth, the relief being exaggerated to more clearly show the extent of the same.
Figure 3:
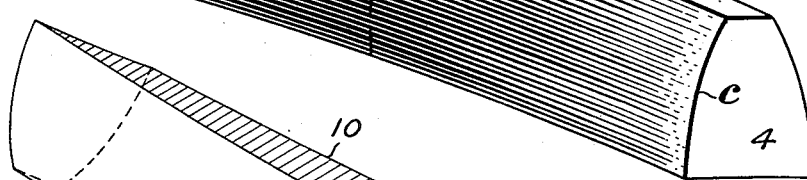
Fig. 3 is a view similar to Fig. 2 in which the working face is shaded to show the manner in which the bearing pressure against the working face increases from the approaching edge of such faces toward the opposite end of the face.

Considering the gear 2 as a driven gear only and rotatable only in the direction of the arrow "a", the set of gears shown in Fig. 1 can be considered for illustration as a set suitable for operation as timing gears in an internal combustion engine, in which case Figs. 2 and 3 represent one of the teeth of the driven gear 2.

In adapting my invention to such an operating condition I form the driven face 5 of the tooth 4 with an area of relief which gradually decreases in depth. This relief is represented by the space 6 shown at the approaching end "c" of the driven tooth 4 between the solid finished profile line 7 and the dotted line 8, which represents the original tooth profile before the formation of the relief. It will be noted in Fig. 2 that this relieved area is uniform from the tip to the base of the face 5 but gradually decreases in depth from a maximum at the approaching end "c" over the face and fades out into the normal or original profile of the face in a region here shown as near the center of the face 5 as represented by the line 9.

In Fig. 3 the working face 5 of the tooth is shaded to show the intensity of the bearing pressure on such face and it will be noted that the shading is light at the approaching end "c" of the face 5 and gradually increases in darkness up to the region of the line 9, thus showing that the bearing pressure gradually increases in intensity from the approaching end "c" up to the region of the line 9 at which region the bearing pressure becomes substantially its maximum and is substantially uniform from that region to the other or receding end of the tooth.

Figure 4:
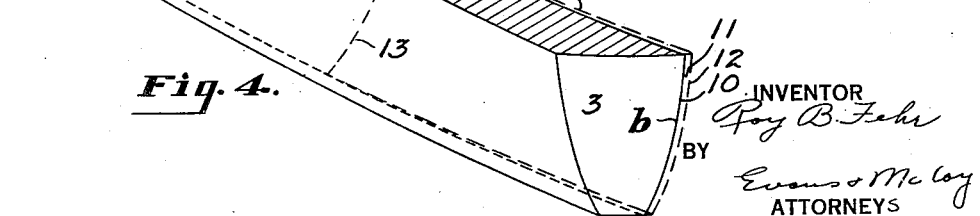
Fig. 4 is a perspective view of one of the teeth of the upper gear shown in Fig. 1 in which the driving face of that tooth is relieved at its approaching end in the same manner as the driven tooth shown in Fig. 2, the relief being exaggerated.

As before stated, the relief may be applied to the approaching end of the working face of the driving tooth 3 instead of to the driven tooth 4, and I have, therefore, shown in Fig. 4 a driving tooth 3 which contacts the tooth 4 shown in Fig. 2. This tooth 3, of course, is inverted and the area of relief is the same as that on the tooth 4, it being at the approaching end "b" of the working face 10 represented by the solid line 10 and being illustrated by the space 11 between the solid line 10 and the original profile line 12 which is dotted. The driving face 10 of this tooth is concealed but I have indicated the fading out of the relieved area by a dotted line 13 intermediate the ends of the working face.

If desired, the area of relief may be divided between the working faces 5 and 10 of the teeth 4 and 3, respectively, in which case the relief shown on each of these faces in Figs. 2 and 4 will be of lesser depth but fading out in approximately the same regions.

Furthermore, it may also be formed on tooth structures embodying the invention disclosed in my Patent 1,813,875 in which case two different types of relief are employed for the driven gear.

Figure 5:
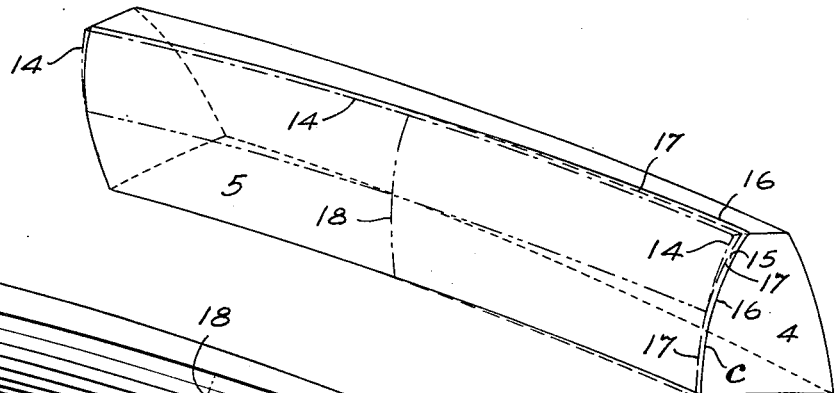
Fig. 5 is a perspective view of a tooth of the lower gear showing the application of the relief illustrated in Fig. 2 to a gear tooth in which the addendum of the driven face thereof is further provided with a gradual relief.
Figure 6:
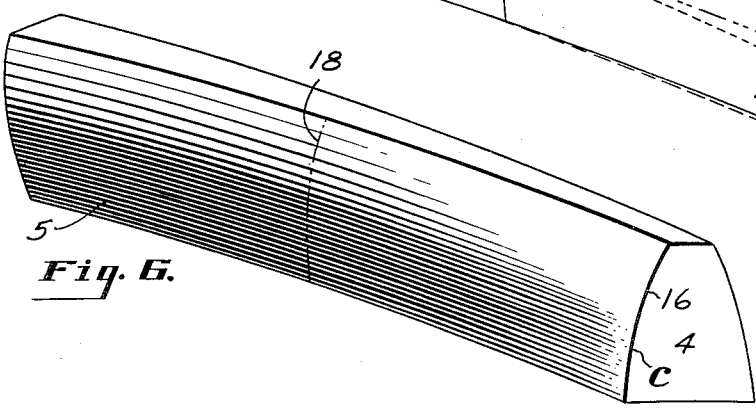
Fig. 6 is a view similar to Fig. 5 showing the manner in which the pressure is applied to the driven face of the gear tooth.

In Fig. 5, the addendum face of the driven side 5 of the tooth 4 is formed with a gradual relief, represented by the dash and dot original addendum contour line 14, which extends throughout the entire length of the tooth and which is of a maximum at the tip of the tooth and gradually fades out to zero substantially at the pitch line. In this case the relieved area of the present invention is formed in the same manner as described in connection with the tooth shown in Fig. 2. The relief is represented in this case by the space 15 between the solid contour line 16 and the dotted line 17. This relief also is of a maximum at the approaching end "c" of the tooth and gradually fades out near the center of the tooth as indicated by the line 18. In a tooth of this character very little action occurs during the angle of approach and for this reason I have illustrated shading in Fig. 6 to show the intensity of bearing pressure on the driven face 5 of the tooth 4. It will be noted in Fig. 6 that the shading is very light in the dedendum portion of the tooth at the approaching end thereof and gradually becomes darker as the region of the line 18 is approached, although above the pitch line 14 the pressure gradually fades out.

Figure 7:
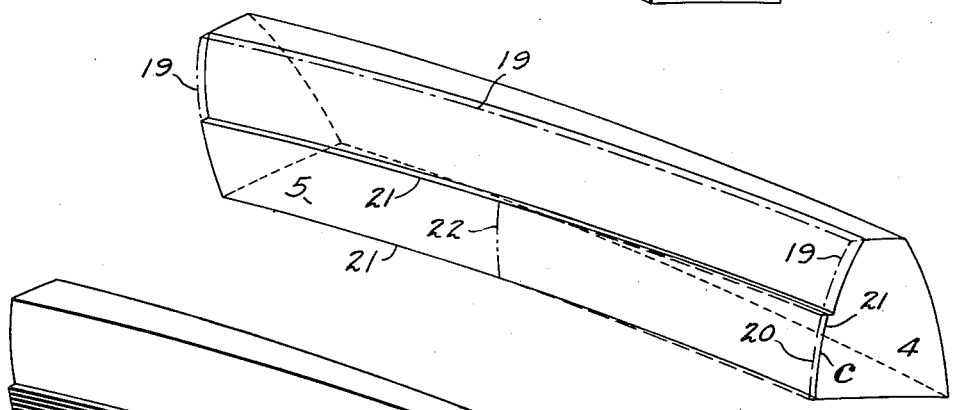
Fig. 7 is a perspective view similar to Fig. 2 but showing the relief illustrated in Fig. 2 applied to a tooth in which the addendum surface of the driven side of the tooth is formed with an abrupt relief extending throughout the length of the driven face and extending from the tip substantially to the pitch line.

Fig. 7 illustrates a tooth similar to the one illustrated in Fig. 5 and is the same with the exception that the gradual addendum relief in the working face 5 is replaced by an abrupt relief, represented by the dash and dot line 19.

Inasmuch as there is no engagement of the addendum surface of the driven side 5 of the tooth 4 shown in Fig. 7 during the angle of approach, it is obvious that the helix relief of the present invention need only be applied to the dedendum surface as represented by the dotted line 20 at the approaching end "c" which merges into the solid profile line 21 in the region of the line 22 intermediate the ends of the teeth.

Figure 8:
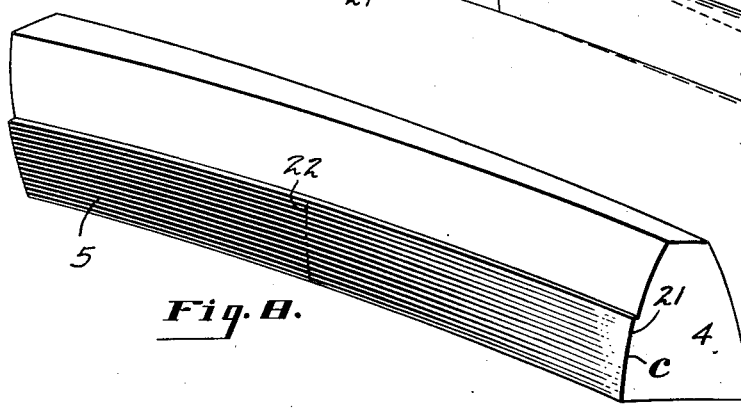
Fig. 8 is a view similar to Fig. 7, having its face shaded to show the manner in which the pressure is applied to the driven side of the tooth.

In Fig. 8 it will be noted that the entire bearing pressure is taken by the dedendum surface of the working face of the tooth and is a minimum at the approaching end "c" of the working face 5 and gradually increases in intensity to the region of the line 22 which represents the longitudinal extent of the relieved area of gradually diminishing depth.

Although not shown in the drawings, the driving face 10 of the driven tooth 3, illustrated in Fig. 4, may also be formed with a relief over its dedendum surface to reduce tooth action during the angle of approach, and such dedendum relief may be of the gradual or abrupt type.

One of the other conditions which I have previously mentioned is that in which the tooth of the driven gear may either drive or may be driven, but always in a single direction, such as in vehicle transmissions wherein the driving gear frequently becomes a driven gear as when the vehicle is coasting.

In Fig. 9, I have shown such a driven tooth. In this case the area of relief is provided on both surfaces of the tooth and at the same end because when the tooth 4 shown therein is driven the end "c" of the working face 5 is the approaching end, and when the tooth 4 is driving, the end "e" of the driving face 5a is also the approaching end since the direction of rotation of the gear is not changed. The area of relief on the working face 5, which is the driven face, is identical with that shown in Fig. 2, and I have applied the same numbers thereto as used in Fig. 2. Since the relief on the opposite face 5a is at the same end as the relief on the end of the face 5, I have designated the same by the same numerals with the suffix "a". Since the action on both sides of the tooth in this case is practically the same no further description, therefore is bel'eved necessary.

In Fig. 12 the same application of the areas of relief is applied to the working faces 10 and 10a, the face 10 being as in Fig. 4, the driving face and the face 10a being the driven face, the end "f" being the approach'ng end of the driven face 10a.

In Figs. 10 and 11, I have shown the relief illustrated in Fig. 9 applied to a gear tooth in which the addendum surface of the driven side 5 of the tooth is formed with a relief extending throughout the length thereof and in which the dedendum surface of the driving side 5a of the tooth is formed with a relief extending throughout the length thereof. In Fig. 10 the addendum and dedendum reliefs shown are of the gradual type, the relief at the driven side 5 being of a maximum depth at the tip of the tooth and gradually fading out to zero in the region of the pitch line and the relief at the driving side 5a being of a maximum at the base of the tooth and gradually fading out to zero substantially at the pitch line. In Fig. 11 the addendum relief on the driven face 5 of the tooth is abrupt and extends from the tip substantially to the pitch line as in Fig. 5, and the dedendum relief on the driving face 5a of the tooth is abrupt and extends from the region of the pitch line to the base of the tooth. The reliefs of the present invention employed in Figs. 10 and 11 are identical with the relief described in connection with Figs. 5 and 7, and need no further explanation.

Figure 13:
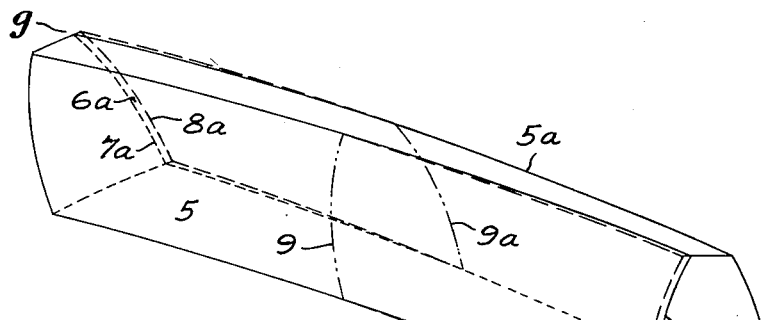
Fig. 13 is a perspective view showing the application of the relieved areas of the present invention to a driven tooth which is always a driven tooth but which may be driven in opposite directions.

I have also referred to a further condition wherein one tooth is always the driving tooth but is reversible in the direction of rotation, and I have shown in Fig. 13 the application of the relieved areas of my invention to such a tooth. When the tooth 2 is driven in the direction of the arrow "a", shown in Fig. 1, the driven side 5 is, of course, relieved in the same manner as indicated in Fig. 2. However, when the direction of rotation is reversed, as indicated by the arrow "g" in Fig. 1, the opposite side 5a becomes a driven side and the end "g" opposite the end "c" becomes the approaching end of the tooth because of the change in direction of rotation, and the area of relief is applied at the approaching end "g" of the face 5a as shown in Fig. 13, which relief, however, is identical with the relief used at the approaching end "c" of the opposite face 5. The driving tooth in this case, in which either face may drive, may be relieved in the same manner instead of the driven tooth, as shown in Fig. 16, in which case the relieved area applied in Fig. 4 is the same at the approaching end b of the corresponding working face 10 and in which the same type of relief is applied to the opposite driving face 10a but at the opposite end h which becomes the approaching end when the direction of rotation is reversed to make the face 10a the driving face.

Figure 14:
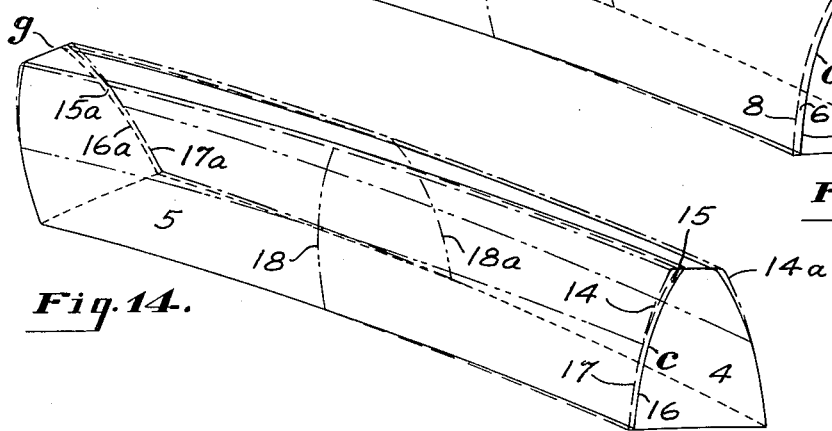
Fig. 14 is a view similar to Fig. 13 in which the relieved areas illustrated in Fig. 13 are applied to a tooth in which both addendum surfaces are also formed with a gradual relief extending throughout the length thereof.
Figure 15:
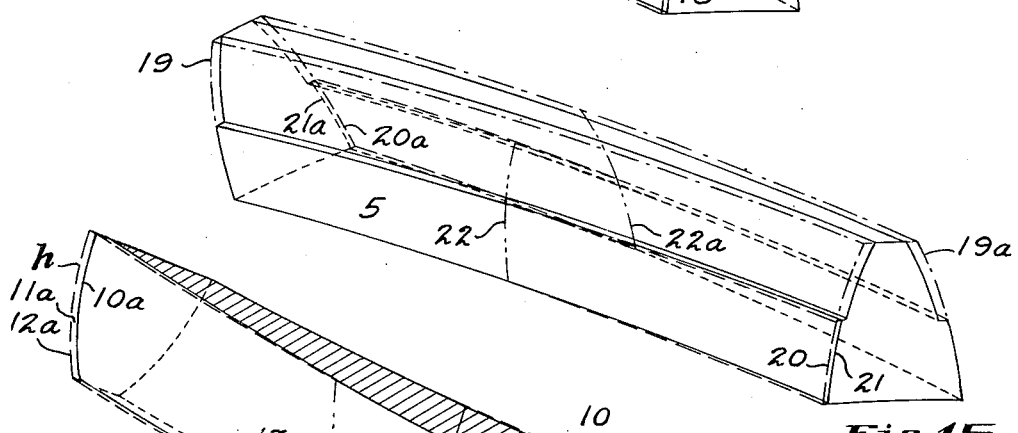
Fig. 15 is a view similar to Fig. 13 in which the relieved areas illustrated in Fig. 13 are applied to a tooth in which both addendum surfaces are also formed with an abrupt relief extending throughout the length thereof.

Figs. 14 and 15 also represent teeth which operate under the same condition, that is the teeth are always driven but may be driven in either direction. In Fig. 14 the relief illustrated in Fig. 13 is applied to the tooth having addendum surfaces which are gradually relieved. In Fig. 15 the relief illustrated in Fig. 13 is applied to the tooth having abrupt reliefs formed in its opposite addendum surfaces.

Figure 16:
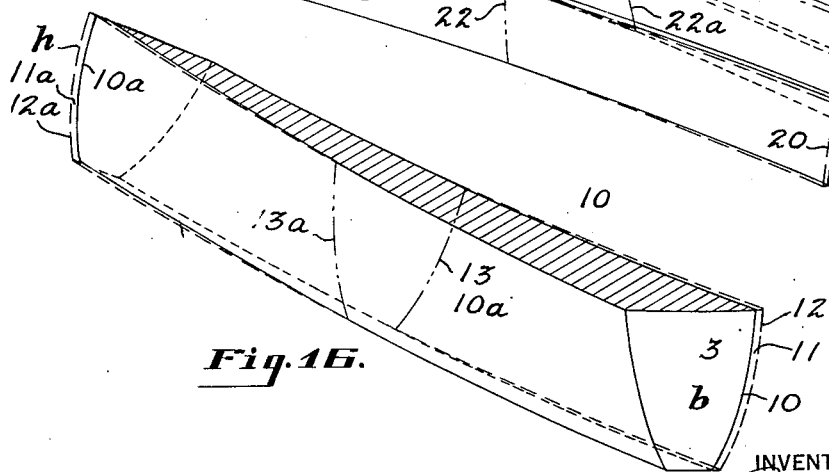
Fig. 16 is a perspective view of a driving tooth in which the relieved areas of the present invention are applied thereto, in this case the tooth being one which is always driving but in either direction.

Furthermore, when the reliefs are applied to the driving tooth as shown in Fig. 16, the dedendum surfaces of the driving tooth may be further formed with abrupt or gradual reliefs as disclosed in my Patent No. 1,813,875.

I have described several different applications of my relief to tooth faces which may or may not be formed with an additional relief of the character referred to in my Patent No. 1,813,875. It is to be noted, however, that in each case described, regardless of whether a particular tooth face is driving or being driven, such face is formed with what may be termed a helix relief which extends from the edge of the approaching end of the face toward the opposite end and fades out intermediate the ends of the relieved face. This relief, however, is of such a nature that at the start of engagement of two working faces the tooth pressure will be very light and gradually increase to its full value in a region preferably intermediate the ends of the faces.

It is to be borne in mind that the object of the present invention is to provide the area of relief between the approaching ends of two mating faces whether it be on the driving or driven face or partially on each face, so long as the intensity of tooth pressure will gradually increase to its full value after the teeth are once in engagement, in order to avoid sacrifice in the number of tooth contacts or in tooth action.

The relief of the present invention may be formed in any suitable manner whether it be by cutting, grinding or lapping.

By utilizing the helix relief of the present invention, it will be seen that when the shafts on which the gears are mounted are slightly out of alignment and particularly when there is a tendency, by reason of such misalignment, to produce a greater bearing pressure at the approaching ends of the mating tooth faces, the mating teeth will engage with substantially no impact, whereby quiet operation may be obtained. It will also be seen that this same advantage is derived when the helix relief of the present invention is applied to gear teeth which are also relieved in accordance with the disclosure of my aforesaid Patent No. 1,813,875.

Furthermore, it is to be understood that the particular form of invention shown and described, and the particular procedure set forth, are presented for purposes of explanation and illustration and that various modifications of said invention and procedure can be made without departing from my invention as defined in the appended claims.

What I claim is:

1. A gear having helical teeth, the working face of each tooth having an area of relief at its approaching end, said area of relief being of maximum depth at such end and gradually decreasing in depth toward the opposite end of said working face.

2. A gear having helical teeth, the working face of each tooth having an area of relief extending from the tip to the base thereof, said area of relief extending longitudinally and being of gradually decreasing depth from the approaching end to a region intermediate the ends of the said working face.

3. A gear having helical teeth, the working faces of the teeth having longitudinally extending areas of relief, said areas of relief being of maximum depth at the approaching ends of said working faces and gradually fading out to zero intermediate the ends of said working faces.

4. A gear having helical teeth, each tooth having a driven face, and a driving face, and each of said faces at its approaching end having a longitudinally extending area of relief of gradually decreasing depth, said area of relief being of maximum depth at said approaching end and of zero depth intermediate the ends of the said face.

5. A gear having helical teeth, the opposed faces of each tooth being driven faces, each of said driven faces at its approaching end having a longitudinally extending area of relief of gradually decreasing depth, said area of relief being of maximum depth at said approaching end and of zero depth intermediate the ends of the said face.

6. A gear having helical teeth, the opposed faces of each tooth thereof being driving faces, each of said driving faces at its approaching end having a longitudinally extending area of relief of gradually decreasing depth, said area of relief being of maximum depth at said approaching end and of zero depth intermediate the ends of the said face.

7. A pair of gears having helical teeth engageable with each other, the mating faces of said teeth being formed to have a contact pressure greater intermediate the ends and at the receding ends than at the approaching ends thereof by providing certain of said mating faces with longitudinal areas of relief of maximum depth at said approaching ends and of minimum depth intermediate the ends of such faces.

8. A gear having helical teeth, each tooth having a driven side provided with addendum and dedendum faces, the addendum faces of each driven side having a relief extending throughout the length thereof and from its tip substantially to the pitch line, each driven side also having a longitudinally extending area of relief of gradually decreasing depth, said last mentioned area of relief being of maximum depth at the approaching end of said driven side and of zero depth intermediate the ends of the said driven side.

9. A gear having helical teeth, each tooth having a driving side provided with addendum and dedendum faces, the dedendum face of each driving side having a relief extending throughout its length and from its base substantially to the pitch line, each driving side also having a longitudinally extending area of relief of gradually decreasing depth, said last mentioned area of relief being of maximum depth at the approaching end of said driving side and of zero depth intermediate the ends of the said driving side.

10. A gear having helical teeth, each tooth having a driven side provided with addendum and dedendum faces, the addendum faces of each driven side having a relief extending throughout the length thereof and from its tip substantially to the pitch line, said relief being of gradually decreasing depth from said tip to the region of said pitch line, each driven side also having a longitudinally extending area of relief of gradually decreasing depth, said last mentioned area of relief being of maximum depth at the approaching end of said driven side and of zero depth intermediate the ends of the said driven side.

11. A gear having helical teeth, each tooth having a driving side provided with addendum and dedendum faces, the dedendum face of each driving side having a relief extending throughout its length and from its base substantially to the pitch line, said relief being of gradually decreasing depth from said base to the region of said pitch line, each driving side also having a longitudinally extending area of relief of gradually decreasing depth, said last mentioned area of relief being of maximum depth at the approaching end of said driving side and of zero depth intermediate the ends of the said driving side.

ROY B. FEHR.